United States Patent [19]

Weideman

[11] Patent Number: 4,853,969

[45] Date of Patent: Aug. 1, 1989

[54] QUANTIZED DIGITAL FILTER

[75] Inventor: William E. Weideman, Arlington, Tex.

[73] Assignee: Recognition Equipment Incorporated, Irving, Tex.

[21] Appl. No.: 195,428

[22] Filed: May 10, 1988

Related U.S. Application Data

[63] Continuation of Ser. No. 2,728, Jan. 13, 1987, abandoned.

[51] Int. Cl.$^4$ .............................................. G06K 9/40
[52] U.S. Cl. ........................................ 382/54; 382/50; 341/50; 341/95; 364/724.03
[58] Field of Search ............................. 375/25, 30, 31; 364/724.03, 745; 358/135, 136; 379/406; 341/50, 95; 382/41, 47, 50, 54, 56

[56] References Cited

U.S. PATENT DOCUMENTS

| | | | |
|---|---|---|---|
| 4,200,886 | 4/1980 | Musmann et al. | 358/135 |
| 4,292,651 | 9/1981 | Kretz et al. | 358/135 |
| 4,414,536 | 11/1983 | Sumi | 340/347 DD |
| 4,468,790 | 8/1984 | Hofelt | 375/26 |
| 4,540,973 | 9/1985 | Grallert | 340/347 DD |
| 4,571,737 | 2/1986 | Nishitani et al. | 340/347 DD |
| 4,583,074 | 4/1986 | Okamoto et al. | 341/95 |
| 4,593,267 | 6/1986 | Kuroda et al. | 341/95 |
| 4,614,935 | 9/1986 | Fling | 341/95 |
| 4,622,537 | 11/1986 | Aiko | 340/347 DD |
| 4,684,925 | 8/1987 | Maruta | 340/347 DD |

OTHER PUBLICATIONS

Orback, Zvi, "New Types of Adaptive Quantizers", IEEE Trans. on ASSP, vol. ASSP-32, No. 5, pp. 1006-1013, Oct. 1984.

Goodman, D. J. and Gersho, A., "Theory of an Adaptive Quantizer", IEEE Trans. Commun., vol. COM-22, No. 8, pp. 1037-1045, Aug. 1974.

Mitra, D., "Mathematical Analysis of an Adaptive Quantizer", Bell Syst. Tech. J., vol. 53, No. 5, pp. 867-898, May-Jun. 1974.

Goodman, D. J. and Wilkinson, R. M., "A Robust Adaptive Quantizer", IEEE Tans. Commun., vol. COM-23, pp. 1362-1365, Nov. 1975.

Golding, L. S., and Schultheiss, P. M., "Study of an Adaptive Quantizer", Proc. IEEE, vol. 55, No. 3, pp. 293-297, Mar. 1968.

Jayant, N. S., "Adaptive Quantization with a One-Word Memory", Bell Syst. Tech. J., vol. 52, No. 7, pp. 1119-1144, Sep. 1973.

Primary Examiner—Leo H. Boudreau
Assistant Examiner—Jose L. Couso
Attorney, Agent, or Firm—Ross, Howison, Clapp & Korn

[57] ABSTRACT

A signal processing system (10) is provided for digitally filtering an input digital signal. The signal processing system (10) includes a digital filter (12) without normal finite precision arithmetic whose output is applied to an adaptive quantizer (14). The output of the adoptive quantizer (14) includes a digital signal having a number of bits per sample which is less than or equal to the number of bits per sample contained in the output of the digital filter (12).

4 Claims, 2 Drawing Sheets

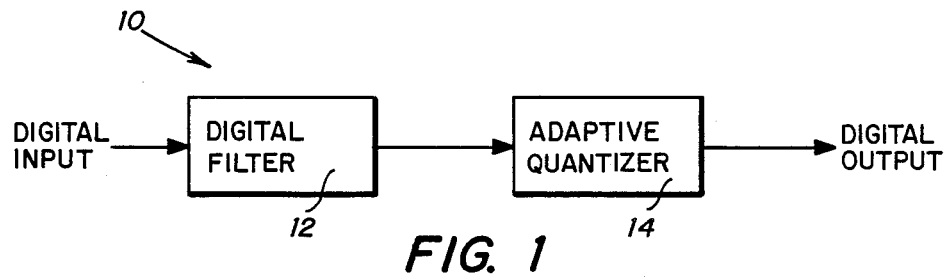
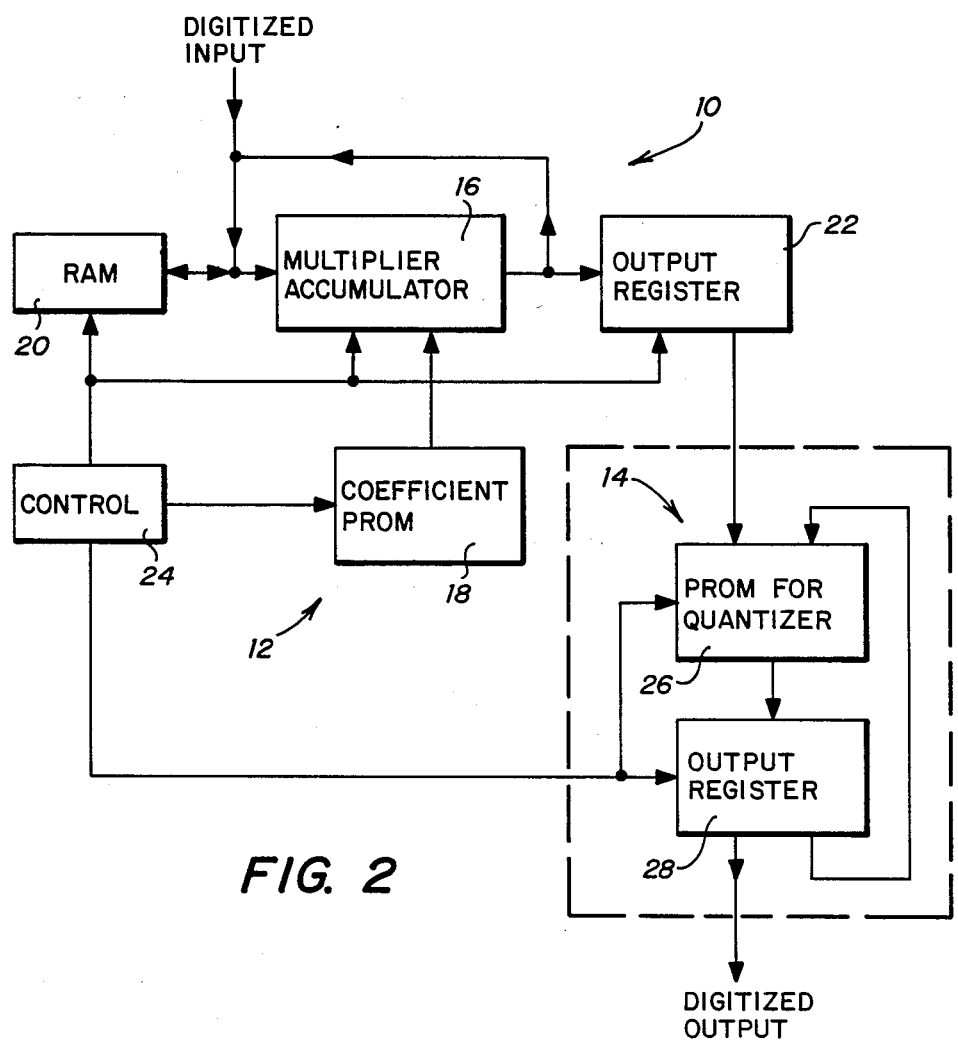

QUANTIZED DIGITAL FILTER

This application is a continuation, of application Ser. No. 002,728, filed Jan. 13, 1987, now abandoned.

TECHNICAL FIELD

This invention relates to signal processing systems, and more particularly to a digital image processing system utilizing an adaptively quantized digital filter.

BACKGROUND ART

Image processing systems are utilized for capturing images of documents. Such images may be stored if not used immediately for processing of information or immediately displayed to an operator via a terminal at a workstation. The quality of the images captured by an image processing system is related to the number of bits per picture element which are chosen to represent portions of the image. Generally, an image processing system captures an image, digitizes the captured image for storage and displays the image. Image processing systems also utilize filters for enhancing the image which results in a sharper and more definite display of the original image. Filtering may be utilized to remove noise from the digitized signal or to compensate for optical parameters in the image capture equipment. Images with low print contrast often suffer degradation from finite precision arithmetic performed by the filter.

In image processing systems, it is also desirable to reduce the representation of the image to a smaller number of bits per picture element without an appreciable loss of information to accomplish very high speed processing of images. Unlike image compression which requires a reduction in the amount of stored data, high speed processing requires that the image have a small number of bits per picture element. It is therefore desirable to reduce the number of bits per picture element for both image reduction for subsequent processing and to solve finite arithmetic processing problems.

The reduction of the number of bits per picture element which represent an image can be accomplished by thresholding the image. Another technique used is to scale the image by a constant so that the dynamic range of the input image matches the dynamic range of the desired image. For example, the input image may have four bits per picture element and the desired image has two bits per picture element. Adaptive quantizing methods have also been proposed, but merely address the digitization of an original analog signal. By filtering and scaling the image before thresholding, the resulting image can also be improved; however, these results are not completely satisfactory.

The major source of degradation of the desired image is the finite precision arithmetic noise introduced into the signal from the finite arithmetic steps performed by the digital filter. Presently, two methods of implementing finite precision arithmetic are used. These methods either round or truncate the results of the arithmetic operations in order to maintain the same number of bits per sample in the output data as the input data. With the use of accumulators and multiply-accumulators having extra precision bits, it is possible to delay rounding or truncating the result until all the arithmetic operations are completed. However, the noise is only reduced and not eliminated.

A need has thus arisen for a signal processing system such as used in an image processing system in which finite precision arithmetic is performed with a minimum amount of finite precision arithmetic noise. A need has further arisen for an image processing system which allows for the number of bits per picture element to increase while filtering and which adaptively quantizes the resulting image to a reduced desired number of bits per picture element.

DISCLOSURE OF THE INVENTION

In accordance with the present invention, an image processing system is provided which substantially eliminates the problems heretofore associated with performing finite arithmetic using digital filters.

In accordance with one aspect of the present invention, a signal processing system for processing a digital signal having a number of bits per sample is provided. A filter is provided for receiving the digital signal and for generating a filtered digital signal corresponding to the original signal. The filtered digital signal includes a number of bits per sample which is greater than the number of bits per sample in the original input signal. The digital filtered signal is applied to a quantizer for adaptively quantizing the digital signal corresponding to the filtered digital signal, such that the quantized digital signal includes a number of bits per sample which is less than the number of bits per sample contained in the filtered digital signal.

BRIEF DESCRIPTION OF THE DRAWINGS

For a complete understanding of the present invention and for further advantages thereof, reference is now made to the following Detailed Description taken in conjunction with the accompanying Drawings, in which:

FIG. 1 is a block diagram of the present signal processing system;

FIG. 2 is a block diagram of the present signal processing system illustrating the digital filter and adaptive quantizer in more detail.

DETAILED DESCRIPTION

Figure 3:
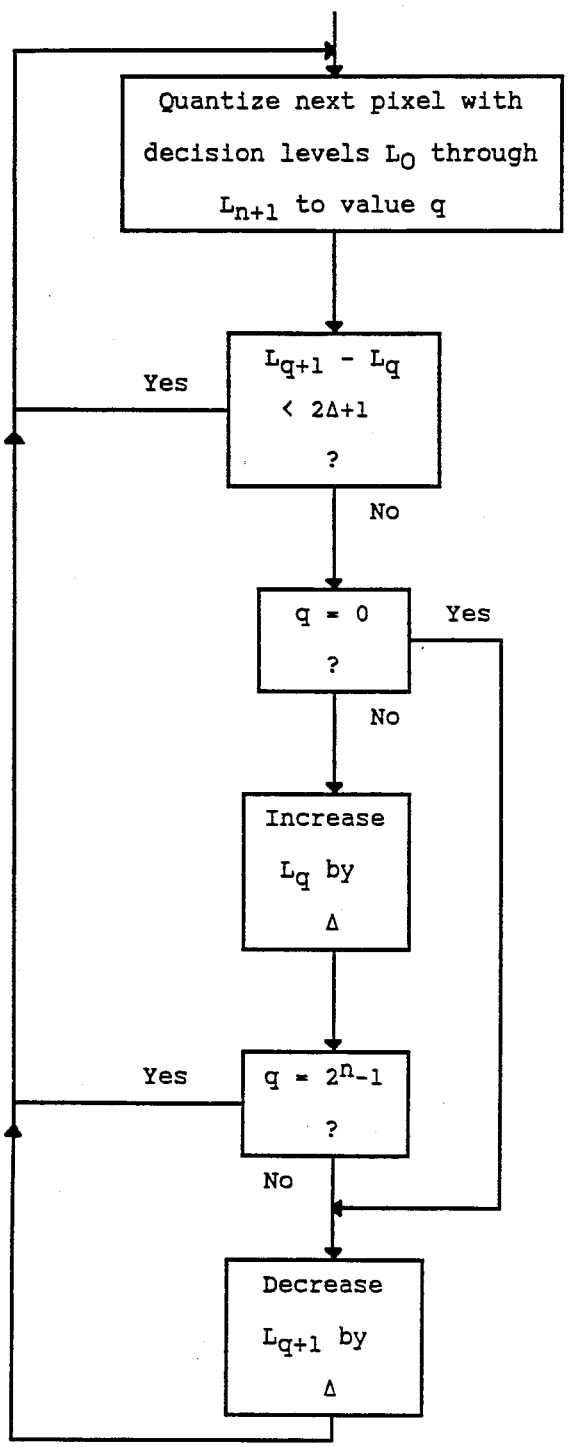
FIG. 3 is a software flowchart of an algorithm for use with the present adaptive quantizer.

Referring to FIG. 1, a block diagram of the present signal processing system is illustrated and is generally identified by the numeral 10. Signal processing system 10 processes a digital input signal having a predetermined number of bits per sample into a digital output signal having a desired number of bits per sample. The digital input signal may represent, for example, a digitized image of a document, digitized voice signals or digitized television signals. The present signal processing system 10 is not limited to image processing, although the present discussion is primarily concerned with digital image processing.

The digital input signal is applied to a digital filter 12 which may comprise, for example, a finite impulse response (FIR) or an infinite impulse response (IIR) filter. Digital filter 12 functions to enhance the image represented by the original digital input signal. However, the operation of digital filter 12 through the arithmetic operations it performs increases the number of bits per sample contained in the filter signal. Since it is desired to have the same number of bits per sample or a lesser number of bits per sample in the final output signal representing the digitized image, an important aspect of the present invention is the use of an adaptive quantizer 14 to receive the output of digital filter 12 and reduce the number of bits per sample contained in the output of the digital filter 12. As used herein, an adaptively quantized signal is one in which the quantization levels change according to signal characteristics.

Adaptive quantizer 14 is operative to reduce the number of bits per sample to either equal the number of bits per sample contained in the original digital input signal or to a number less than the original number of bits per sample as desired. Adaptive quantizer 14 operates without truncating or rounding the number of bits per sample in the output signal of digital filter 12 to thereby prevent the introduction of noise into the final digitized image signal which would otherwise have occurred due to truncation or rounding of the number of bits per sample in the output signal of digital filter 12. Although adaptive quantizer 14 does introduce quantization noise, the amount is significantly less than finite precision arithmetic noise.

Referring to FIG. 2, digital filter 12 includes a multiplier-accumulator 16 which receives the original digital input signal. Multiplier-accumulator 16 receives multiplication information or bit weight from a coefficient PROM 18. The multiplication products generated by multiplier-accumulator 16 are stored in a random access memory (RAM) 20 for subsequent use by multiplier-accumulator 16. The final result derived by multiplier-accumulator 16 is applied to an output register 22. Control and timing signals are provided to multiplier-accumulator 16, coefficient PROM 18, RAM 20 and output register 22 from a control 24. Digital filter 12 may comprise, for example, a digital signal processor manufactured and sold by Texas Instruments, Dallas, Tex., Model TMS32010.

The number of bits per sample output by digital filter 12 at output register 22 is greater than the number of bits per sample contained in the original digitized image input signal. The output of output register 22 is applied to adaptive quantizer 14, and more specifically to a programmable read only memory (PROM) 26. PROM 26 performs the algorithm necessary to quantize the filtered signal. The quantized signal is applied to an output register 28 whose output represents the final digitized image signal which has a number of bits per sample which is equal to or less than the number of bits per sample contained in the original digitized input signal. Control 24 also provides control and timing signals to PROM 26 and output register 28. Adaptive quantizer 14 may comprise, for example, a digital signal processor such as a Model TMS32010 manufactured and sold by Texas Instruments, Dallas, Tex.

The present signal processing system 10 for use in an image processing system may result in the processing of a digitized image input signal having, for example, four bits per picture element with the final digitized output signal having four bits per picture element or two bits per picture element as desired. The output of the digital filter 12 may result in a signal having ten bits per picture element. The digital filter 12 uses four bit coefficients that produces an eight bit product when multiplied by the four bits per picture element input signal. The digital filter 12 accumulates the eight bit products to obtain a ten bit result. The extra two bits prevent overflow problems. Using the present invention, no rounding or truncation is performed by digital filter 12 and all precision in the computation performed by digital filter 12 is maintained. This precision results in the signal having less noise and a higher quality image. The adaptive quantizer 14 therefore reduces the ten bits per picture element filtered signal to the desired four bit or two bit per picture element for the final output signal.

The present adaptive quantizer 14 may comprise, for example, a sample-to-sample adaptive decision level quantizer.

$\Delta$ is the adaptation step with:

$$0 < \Delta < 2^{m-n-1} \tag{1}$$

where m is the number of bits per picture element of the unquantized filtered image and n is the number of bits per picture element of the desired image.

Decision levels $L_i$ are chosen by:

$$L^i = \frac{i(2^m)}{2^n} \tag{2}$$

where i is an integer between 1 and n.
By choosing $$L_O = -\Delta \text{ and} \tag{3}$$

$$L_{n+1} = 2^{m-1} + \Delta, \tag{4}$$

the decision levels may adapt over the entire dynamic range.

An algorithm for use with the present adaptive quantizer 14 is described in FIG. 3 and is as follows:

Step 1: Quantize the next input picture element by the decision levels, $L_O$ through $L_{n+1}$ and denote the result as q.
Step 2: If $L_{q+1} - L_q < 2\Delta + 1$, go to Step 1.
Step 3: If q=0, go to Step 6.
Step 4: $L_q = L_q + \Delta$.
Step 5: If $q = 2^n - 1$, go to Step 1.
Step 6: $L_{q+1} = L_{q+1} - \Delta$.
Step 7: Go to Step 1.

By varying the initial values of $L_1$ through $L_n$ or by varying the value of $\Delta$, the resulting image can be made lighter or darker.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A signal processing filter for enhancing an original digital signal including a plurality of samples, each sample having a predetermined number of bits comprising:
    means for filtering the original digital signal and for generating a filtered digital signal including a plurality of samples, each sample corresponding to one of the samples of the original digital signal, said filtered digital signal representing the original digital signal in an enhanced format, said filtering means having coefficients with a number of bits per sample, such that the number of bits per sample of said filtered digital signal includes the total of the number of bits per sample of the original digital signal plus at least one of the bits per sample of the coefficients of said filtering means; and
    means connected to said filtering means for reducing the number of bits per sample in said filtered digital signal to the number of bits per sample of the original digital signal, said reducing means receiving a plurality of said samples of said filtered digital signal including means for adaptively quantizing said samples of said filtered digital signal to generate an adaptively quantized filtered digital signal having a number of samples without compressing the original digital signal, such that each sample of said adaptively quantized filtered digital signal is dependent on the corresponding sample of said filtered digital signal and the previous corresponding sample of said filtered digital signal.

2. The signal processing system of claim 1 wherein said means for adaptively quantizing said filtered digital signal reduces the number of bits per sample in said filtered digital signal to less than the number of bits per sample contained in the original digital signal.

3. The signal processing system of claim 1 wherein said filtering means includes a finite impulse response digital filter.

4. The signal processing of claim 1 wherein said filtering means includes an infinite impulse response digital filter.

* * * * *